United States Patent [19]

Marks

[11] Patent Number: 4,902,758
[45] Date of Patent: Feb. 20, 1990

[54] PREPARATION OF SEGMENTED BLOCK COPOLYCARBONATES

[75] Inventor: Maurice J. Marks, Lake Jackson, Tex.

[73] Assignee: The Dow Chemical Company, Midland, Mich.

[21] Appl. No.: 261,069

[22] Filed: Oct. 24, 1988

[51] Int. Cl.$^4$ ............................................. C08F 283/02
[52] U.S. Cl. .................................... 525/462; 528/199; 528/202
[58] Field of Search ................. 525/462; 528/199, 202

[56] References Cited

U.S. PATENT DOCUMENTS

| | | | |
|---|---|---|---|
| 3,119,787 | 1/1964 | Laakso et al. | 260/47 |
| 3,912,687 | 10/1975 | Haupt et al. | 525/462 |
| 4,075,119 | 2/1978 | Schmidt et al. | 252/182 |
| 4,308,373 | 12/1981 | Mori et al. | 528/202 |
| 4,413,103 | 11/1983 | Katsuhisa et al. | 525/469 |
| 4,737,573 | 4/1988 | Silva et al. | 528/371 |

*Primary Examiner*—Theodore E. Pertilla

[57] ABSTRACT

Segmented block copolycarbonates from diphenols and tetrahalogenated diphenols are prepared by phosgenation, under interfacial reaction conditions, initially at a higher pH during which diphenol polycarbonate oligomers are formed, and thereafter at a lower pH during which tetrahalogenated diphenol bischloroformates are formed, followed by copolymerization utilizing an activated pyridine catalyst. Alternatively, diphenol polycarbonate oligomers and tetrahalogenated diphenol chloroformates may be coupled, utilizing an activated pyridine catalyst, to prepare segmented block copolycarbonates.

44 Claims, No Drawings

PREPARATION OF SEGMENTED BLOCK COPOLYCARBONATES

BACKGROUND OF THE INVENTION

This invention relates to polycarbonates, and more particularly, to a process for the preparation of high molecular weight segmented block copolycarbonates from diphenols and tetrahalogenated diphenols.

Polycarbonates are well-known commercially available resinous materials having a variety of applications. They are typically prepared by the reaction of dihydroxy compounds with a carbonate precursor, such as phosgene, in the presence of a catalyst. Methods of direct phosgenation, interfacial condensation and transesterification, for the preparation of polycarbonates, are described in detail in Chemistry and Physics of Polycarbonates by H. Schnell, John Wiley & Co., N.Y. (1964). Polycarbonates are high temperature, high performance thermoplastic engineering polymers having a combination of good thermal and mechanical properties, especially when the polymers are prepared from one or more aromatic diols. The copolymerization of aromatic diols and tetrahalogenated aromatic diols to form copolycarbonates is commonly practiced in order to improve one or more properties of one of the homopolymers by the incorporation of the other.

Block copolycarbonates from diphenols and tetrahalogenated diphenols are known in the art. U.S. Pat. No. 3,119,787 discloses a process for producing a copolycarbonate of bisphenol A and tetrachlorobisphenol A, wherein prepolymers of each are prepared in separate interfacial polycondensation reactors, then combined in a single reactor where the prepolymers are coupled. However, phosgenation of the tetrachlorobisphenol A in the presence of a tertiary amine catalyst results in a relatively low molecular weight copolycarbonate, which is additionally difficult to wash free from salts and amine catalyst due to the formation of an excessive emulsion layer.

U.S. Pat. No. 4,413,103 discloses the preparation of halogen-containing polycarbonate resin by the copolymerization of polycarbonate oligomers having chloroformate end groups with aromatic halogencontaining polycarbonate oligomers having chloroformate end groups, wherein each of the oligomers has a molecular weight from at least 500 to 10,000. This reference asserts that the washability of the resultant copolymer is impaired when the halogen-containing oligomers have a number average molecular weight less than 1,000. A similar process having the same limitations is disclosed in U.S. Pat. No. 4,308,373.

The copolymerization of a tetrahalogenated bisphenol A and bisphenol A is disclosed in U.S. Pat. No. 3,912,687. A mixture of diphenols is phosgenated at a pH of between 7 and 9 in the presence of a tertiary amine catalyst, thereby resulting in oligomeric reaction products of the phosgene with the tetrahalogenated bisphenol A, while the more basic nonhalogenated bisphenol A remains in the bisphenolate form. Phosgenation of the mixture is then continued at a pH of greater than 13, during which time the nonhalogenated bisphenol A bisphenolates are cocondensed with the tetrahalogenated bisphenol A oligomers. Unfortunately, the disclosed process produces a relatively low molecular weight copolymer which exhibits poor washability resulting from phosgenation of the tetrahalogenated bisphenol A in the presence of a tertiary amine catalyst.

SUMMARY OF THE INVENTION

The present invention is directed toward a novel process for the preparation of high molecular weight segmented block copolycarbonates from diphenols and tetrahalogenated diphenols. It has surprisingly been discovered that such copolycarbonates may be prepared by sequentially:

(A) contacting together a diphenol, a tetrahalogenated diphenol, an organic solvent, and an aqueous metal hydroxide to form a mixture, wherein the diphenol and tetrahalogenated diphenol are in the bisalkali metal phenolate form, and the pH of the aqueous phase of the mixture is within about 10% of the pH of an equilibrium composition consisting solely of an aqueous solution of a molar amount of the diphenol in two normal alkali metal hydroxide;

(B) next, continuously agitating the mixture, and adding to the agitated mixture phosgene and an amount of additional alkali metal hydroxide sufficient to maintain the pH of the mixture within the about 10% range recited in step A, whereby diphenol polycarbonate oligomers having chloroformate end groups are prepared;

(C) thereafter, adding to the agitated mixture additional phosgene sufficient to attain a decreased pH of the aqueous phase to within about 10% of the pH of an equilibrium composition consisting solely of an aqueous solution of a molar amount of the tetrahalogenated diphenol in two normal alkali metal hydroxide;

(D) then, adding to the agitated mixture additional phosgene, while maintaining the pH of the aqueous phase of the mixture within the about 10% range recited in step C, whereby tetrahalogenated diphenol chloroformates are prepared; and (E) finally, adding to the mixture an amount of additional alkali metal hydroxide sufficient to attain and maintain an increased pH of the aqueous phase of the mixture within the about 10% range recited in step A, and an amount of an activated pyridine selected from the group consisting of 4-aminopyridines of the general formula:

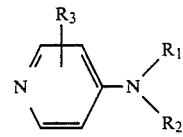

wherein $R_1$ and $R_2$, together with N, form a cyclic alkyl structure, or are each independently a monovalent alkyl radical, or are each independently a polymer chain such that the formula weight of the catalyst is less than 50,000, and $R_3$ is independently hydrogen or a monovalent alkyl radical, or 2-substituted pyridines of the general formula:

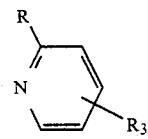

wherein R is a monovalent alkyl radical, a cycloalkyl radical, or a polymer chain such that the formula weight of the catalyst is less than 50,000, and $R_3$ is as previously defined, sufficient to catalyze the coupling of the diphenol polycarbonate oligomers having chloroformate end groups and the tetrahalogenated diphenol chloroformates, whereby a high molecular weight segmented block copolycarbonate is prepared.

Alternatively, such copolycarbonates may be prepared by:

($A_1$) contacting together a diphenol polycarbonate oligomer having chloroformate end groups, a tetrahalogenated diphenol chloroformate, an organic solvent and an aqueous metal hydroxide to form a mixture, wherein the pH of the aqueous phase of the mixture is within about 10% of the pH of an equilibrium composition consisting solely of an aqueous solution of a molar amount of the diphenol polycarbonate in two normal alkali metal hydroxide; and ($B_1$) thereafter, adding to the mixture an amount of an activated pyridine selected from the group consisting of 4-aminopyridines of the general formula:

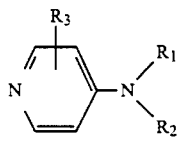

wherein $R_1$ and $R_2$, together with N, form a cyclic alkyl structure, or are each independently a monovalent alkyl radical, or are each independently a polymer chain such that the formula weight of the catalyst is less than 50,000, and $R_3$ is independently hydrogen or a monovalent alkyl radical, or 2-substituted pyridines of the general formula:

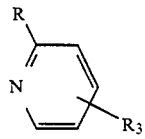

wherein R is a monovalent alkyl radical, a cycloalkyl radical, or a polymer chain such that the formula weight of the catalyst is less than 50,000, and $R_3$ is as previously defined, sufficient to catalyze the coupling of the diphenol polycarbonate oligomers having chloroformate end groups and the tetrahalogenated diphenol chloroformates, whereby a high molecular weight segmented block copolycarbonate is prepared.

The high molecular weight segmented block copolycarbonates of the present invention exhibit high temperature and hydrolytic stability, increased flame retardancy, superior solvent resistance and washability, and excellent thermoplastic engineering properties, making them particularly suitable for producing molded plastic components.

DETAILED DESCRIPTION

Accordant with the present invention, high molecular weight segmented block copolycarbonates are prepared by a sequence of essential steps wherein diphenol and tetrahalogenated diphenol monomers are phosgenated, in an interfacial mixture of water and a solvent, at differing pH conditions, in order to form diphenol polycarbonate oligomers having chloroformate end groups and tetrahalogenated diphenol chloroformate monomers. During a subsequent step, the chloroformate oligomers and monomers are coupled utilizing an activated pyridine catalyst. Alternatively, diphenol polycarbonate chloroformate oligomers and either tetrahalogenated diphenol chloroformate monomers or oligomers may be prepared by known processes, and thereafter coupled utilizing an activated pyridine catalyst.

Diphenols useful in the present invention are represented by the general formula:

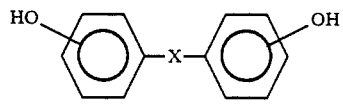

wherein X is a divalent $C_1$-$C_{15}$ alkyl, cyclic or branched hydrocarbon radical, a single bond, —O—, —S—, —$S_2$—, —SO—, —$SO_2$—, or —CO—. Suitable diphenols include, but are not limited to:
bis(4-hydroxyphenyl)-sulphone,
bis(3-hydroxyphenyl)-sulphone,
bis(2-hydroxyphenyl)-sulphone,
bis(4-hydroxyphenyl)-methane,
1,1-bis(4-hydroxyphenyl)-propane,
1,1-bis(4-hydroxyphenyl)-butane,
1,1-bis(4-hydroxyphenyl)-heptane,
2,2-bis(4-hydroxyphenyl)-propane,
1,1-bis(4-hydroxyphenyl)-cyclopentane,
1,1-bis(4-hydroxyphenyl)-cyclohexane;
and the like.

A preferred diphenol is 2,2-bis-(4-hydroxyphenyl)-propane (bisphenol A).

Additionally, diphenols having a single or joined aryl rings may be employed in place of the abovementioned diphenols. Such compounds include, for example, resorcinol, hydroquinone, 1,5-dihydroxynaphthalene, and the like.

Tetrahalogenated diphenols for use according to the present invention are represented by the general formula:

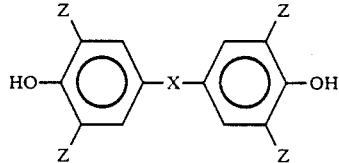

wherein Z is a halo radical and X is as previously defined. Suitable tetrahalogenated diphenols include, but are not limited to:
2,2-bis)4-hydroxy-3,5-dibromophenyl)-propane,
2,2-bis(4-hydroxy-3,5-dichlorophenyl)-propane,
bis(4-hydroxy-3,5-dibromophenyl)-methane,
bis(4-hydroxy-3,5-dibromophenyl)-sulphone,
bis(4-hydroxy-3,5-dibromophenyl)-sulphide,
1,1-bis(4-hydroxy-3,5-dichlorophenyl)-cyclohexane,
and the like.

By tetrahalogenated diphenols is also meant statistical mixtures on non-, mono-, di-, tri-, and tetrahalogenated diphenols, which statistical mixtures contain predominately tetrahalogenated diphenols. These statistical mixtures may be prepared, for example, by the halogenation of bisphenols as described in U.S. Pat. No. 4,075,119, which is incorporated herein in its entirety by reference thereto.

A preferred tetrahalogenated diphenol is 2,2-bis(4-hydroxy-3,5-dibromophenyl)-propane (tetrabromobisphenol A).

Additionally, tetrahalogenated aryl diols may be employed in place of the aforementioned tetrahalogenated diphenols. Such compounds include, for example, 2,3,5,6-tetrabromohydroquinone, 2,3,5,6-tetrachlorohydroquinone, and the like.

Activated pyridines which function as a catalyst in the copolymerization step of the present invention, are compounds whose chemistry and preparation are well-known in the art. By activated pyridine is meant a pyridine or pyridine salt whose catalytic activity in the process of this invention is increased by virtue of having a chemical substituent at the 2 to 4 ring position. Suitable 4-aminopyridines for use according to the present invention are 4-dimethylaminopyridine, 4-pyrrolidinopyridine and poly(N,N-dialkylaminopyridine). Examples of suitable 2-substituted pyridines are methylpyridine, ethylpyridine, isopropylpyridine and polyvinyl pyridine. The aforementioned activated pyridines having additional alkyl groups, such as those represented by the formulae:

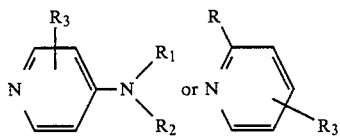

wherein R, R$_1$, R$_2$ and R$_3$ are as previously defined, may also be used. A preferred activated pyridine is 4-dimethylaminopyridine. The amount of catalyst used varies according to the specific diphenol and tetrahalogenated diphenol used, and the reaction temperature, and in general is that amount effective to catalyze the formation of a diphenol and tetrahalogenated diphenol segmented block copolymer.

Alkali metal hydroxides for use according to the present invention include sodium hydroxide, lithium hydroxide, potassium hydroxide, and the like. A preferred alkali metal hydroxide is sodium hydroxide.

Any suitable organic solvent, such as a water-immiscible aliphatic or aromatic chlorinated hydrocarbon which is customarily used in making polycarbonates may be used in practicing the present invention, such as for example methylene chloride, chloroform, 1,2-dichloroethane, and chlorobenzene, and mixtures thereof. A preferred solvent is methylene chloride.

Preparation of the high molecular weight segmented block copolycarbonates of the present invention is carried out in a series of essential steps in which, in the first step, contact is made between a diphenol, a tetrahalogenated diphenol, an organic solvent, and an aqueous solution of an alkali metal hydroxide, as a two phase, agitated system in a reaction vessel. The alkali metal hydroxide must be present in an amount such that the diphenol and tetrahalogenated diphenol are in the bis-alkali metal phenolate form. The pH of the aqueous phase of the mixture is desirably adjusted, using additional quantities of alkali metal hydroxide, such that it is within about 10% of the pH of an equilibrium composition consisting solely of an aqueous solution of a molar amount of the diphenol in two normal alkali metal hydroxide. For example, in a reaction mixture of bisphenol A and tetrabromobisphenol A, wherein the alkali metal hydroxide is sodium hydroxide, the pH desired for the initial step of the process of the present invention is between about 12 and about 13; this range encompasses the equilibrium pH of an aqueous solution of one mole of bisphenol A and two moles of sodium hydroxide.

During the next step, phosgene is introduced into the agitated two-phase reaction mixture, while the pH is maintained within the 100% range of the first step by adding additional quantities of the alkali metal hydroxide. Phosgene may be introduced in the form of a gas, bubbled into the two-phase mixture, or as a solution of phosgene gas dissolved in a solvent such as, for example, methylene chloride. The addition of phosgene proceeds until substantially all (greater than 90%), as determined by experimentation, of the diphenol is converted to diphenol polycarbonate oligomers having chloroformate end groups.

During the next reaction step, the pH of the aqueous phase of the mixture is allowed to decrease, through the continuous addition of phosgene, until it is within about 10% of the pH of an equilibrium composition consisting solely of a molar amount of an aqueous solution of the tetrahalogenated diphenol in two normal alkali metal hydroxide. In an example of the present process in which bisphenol A and tetrabromobisphenol A are used as reactants, the pH would desirably be maintained between about 10 and about 11, which range encompasses the equilibrium pH of an aqueous solution of one mole of tetrabromobisphenol A and two moles of sodium hydroxide. Phosgene is continuously added, and the reaction proceeds until substantially all (greater than 95%) of the tetrahalogenated diphenol is converted to predominately bischloroformates. Tetrahalogenated diphenols are both more acidic and less reactive than their corresponding unsubstituted diphenols. This higher acidity results in a lower pH of an aqueous solution of a tetrahalogenated diphenol and two equivalents of an alkali metal hydroxide. Phosgenation of these tetrahalogenated diphenols results in the preparation of predominately bis- and monochloroformates rather than polycarbonate oligomers.

The final portion of the reaction, according to the present invention, consists of coupling the diphenol polycarbonate oligomers having chloroformate end groups and the tetrahalogenated diphenol bischloroformates at the higher pH, utilizing an activated pyridine catalyst. The use of such a catalyst is disclosed in U.S. Pat. No. 4,286,085, incorporated herein by reference thereto, for the reaction between a dihydroxy phenol and a carbonate precursor. However, the reference does not suggest that an activated pyridine would be an effective catalyst for the condensation reaction between molecules having chloroformate end groups, but only discloses the coupling of molecules having chloroformate end groups with diols.

Alternatively, diphenol polycarbonate oligomers having chloroformate end groups and either tetrahalogenated diphenol chloroformates or tetrahalogenated diphenol oligomers having chloroformate end groups, may be prepared from the diphenols and tetrahalogenated diphenols mentioned hereinabove by conventional interfacial of solution polymerization processes, then coupled at the higher pH utilizing the procedure described in step E. Tetrahalogenated diphenol oligomers having chloroformate end groups may be prepared, for example, by the oligomerization of tetrahalobisphenols using quarternary ammonium salts as described in the publication by Frietag et al., "Polycarbonates," Encyclopedia of Polymer Science and Technology, vol. 11, Wiley & Co., New York, p 648 (1988). See also U.S. Pat. No. 4,316,980. Diphenol polycarbonate oligomers having chloroformate end groups may be characterized by repeated units of the general formula:

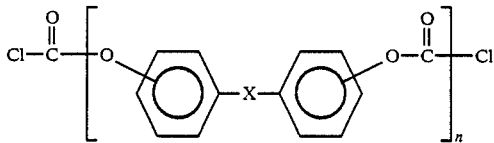

wherein X is a divalent $C_1$–$C_{15}$ alkyl, cyclic or branched hydrocarbon radical, a single bond, —O—, —S—, —$S_2$—, —SO—, or —CO—. Tetrahalogenated diphenol chloroformates may be monomeric:

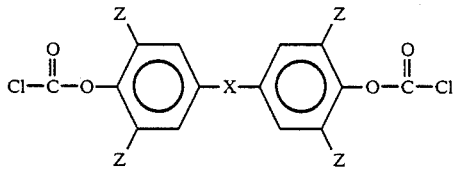

or oligomeric, having repeated units corresponding to the general formula:

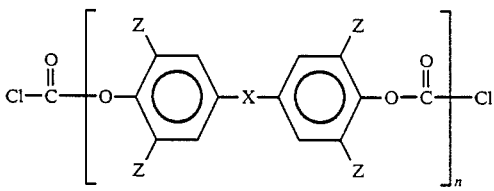

wherein, in either case, X is as previously defined, and Z is a halo radical.

Steps A through E of the process of the present invention may be conducted in a singular reaction vessel. Alternatively, steps A through E may be conducted independently in a series of individual reaction vessels, wherein at least a portion of the reaction mixture prepared in a first reaction vessel in step A is transferred to a second reaction vessel wherein step B is conducted, and so on through step E. The contemplated individual reaction vessels may additionally be continuous or batch reactors. Finally, steps A through E may be conducted in a continuous reaction system, such as for example a tubular reactor, wherein the reaction system contains multiple reaction zones.

Steps $A_1$ and $B_1$ of the process of the present invention may similarly be conducted in a singular reaction vessel, or independently in individual reaction vessels. The individual reaction vessels may be continuous or batch reactors. Finally, steps $A_1$ and $B_1$ may similarly be conducted in a continuous reaction system wherein there are multiple reaction zones.

It must be understood that other steps may be performed before, during or after the recited sequence of essential steps, as long as they do not change the basic nature of the process. For example, a polymer chain terminator such as, for example, phenol may be added as an additional process step at any time prior to step E.

The reaction temperature during each step of the process of the present invention is not sharply critical but must be high enough to achieve the reaction within a reasonable period of time. The temperature may be selected freely within wide limits, preferably from about 0° C. to about 50° C., and more preferably from about 15° C. to about 30° C.

Process steps A, B and E, as well as alternative process steps $A_1$ and $B_1$, are desirably carried out in a pH range of about 9 to about 13.5, depending upon the starting monomers. As an example, where the starting diphenol is bisphenol A and the starting tetrahalogenated diphenol is tetrabromobisphenol A, steps A, B and E are preferably carried out at a pH between about 12 and about 13. Steps C and D are desirably carried out in a pH range of about 9 to about 12, preferably between about 10 to about 11.

The segmented block copolymers of the present invention may be prepared from diphenols and tetrahalogenated diphenols, or from diphenol polycarbonate chloroformate oligomers and either tetrahalogenated diphenol chloroformate monomers of oligomers, using varying quantities of each monomer or oligomer, wherein the ratio of diphenol to tetrahalogenated diphenol is in the range from about 99:1 to about 1:99, depending upon the desired product characteristics.

The activated pyridine catalyst of the present invention may be employed over a wide range of concentrations, based upon the proportions and characteristics of the diphenol and tetrahalogenated diphenol used in the reaction. Preferably, the catalyst is employed in an amount in the range of from about 0.001 to about 10 mole percent based upon the total moles of diphenol and tetrahalogenated diphenol or their oligomers, and more preferably in the range from about 0.05 to about 5.0 mole percent.

The high molecular weight segmented block copolymers according to the present invention do not suffer from the problems (such as poor washability) disclosed in U.S. Pat. No. 4,413,103, even though prepared from halogen-containing molecules having a number average molecular weight less than 1,000. The number average molecular weight of the bischloroformate of tetrabromobisphenol A, an example of a halogencontaining molecule which is reacted to form the high molecular weight segmented block copolymers of the present invention, is 669 which is well below the operability limitation asserted in U.S. Pat. No. 4,413,103. The present invention advantageously results in the complete conversion into copolymer, with little or no remaining phenolic or chloroformate end groups. The use of the catalyst of the present invention, coupled with the substantially complete conversion of the diphenols to chloroformates, produces copolycarbonates having higher molecular weights and improved washability over those processes disclosed in U.S. Pat. Nos. 3,119,787 and 3,912,687.

The invention is more easily comprehended by reference to a specific embodiment which is representative of the invention. It must be understood, however, that the specific embodiment is provided only for the purpose of illustration, and that the invention may be practiced otherwise than as specifically illustrated and described without departing from its scope.

EXAMPLE 1

A 1 liter reactor, having a mechanical stirrer, thermometer, pH electrode, reactant charge port, phosgene inlet dip tube and gas outlet port, was charged with 35.2 g (0.0648 mole) of tetrabromobisphenol A, 14.8 g (0.0648 mole) of bisphenol A, 0.27 g of 90% phenol, 175 ml of methylene chloride, 315 ml of deionized water, and 21 g of 50% sodium hydroxide which increased the pH of the mixture to about 12.5 (this is within 10% of the equilibrium pH of an aqueous solution of a molar amount of bisphenol A in two normal sodium hydroxide). The mixture was purged with $N_2$, and the reactor placed in an ice bath to maintain a mixture temperature of less than 30° C. Under turbulent mixing conditions, 13 g (0.13 mole) of phosgene was added at a rate of about 1 g/min, while the pH of 12.5 was maintained by intermittent addition of 50% sodium hydroxide, during which the bisphenol A reacted to form oligomers having chloroformate end groups as shown by liquid chromatographic analysis. The pH of the reaction mixture was reduced to about 10 (this is within 10% of the equilibrium pH of an aqueous solution of a molar amount of tetrabromobisphenol A in two normal sodium hydroxide) by the continuous addition of 4 g of phosgene alone. Thereafter, 5 g of additional phosgene was added to the reaction mixture, after which the tetrabromobisphenol A reacted to form predominately tetrabromobisphenol A bischloroformate. The pH of the quiescent mixture was increased to 12.5 by the addition of 50% sodium hydroxide, and 0.08 g (0.05 mole %) of 4-dimethylaminopyridine and 325 ml of methylene chloride were added. Additional 50% sodium hydroxide was introduced intermittently to the agitated mixture to maintain the pH of about 12.5 as the viscosity of the mixture increased. After approximately 15 minutes, the copolymerization was substantially complete, evidenced by the absence of chloroformate in the organic phase. The phases of the unagitated mixture separated rapidly, without the formation of an emulsion layer. The resultant copolycarbonate solution was washed without difficulty with dilute HCl and water to remove the catalyst and inorganic salts. After standing about 18 hours, the copolycarbonate solution contained 1,595 ppm water as indicated by standard Karl Fisher titration. The copolycarbonate, isolated by conventional methods, had a number average molecular weight of 14,316 as determined by gel permeation chromatography using a polycarbonate standard having a number average molecular weight of 12,000.

COMPARISON 1

The following procedure, which is not an example of the invention, was conducted to demonstrate that trialkylamine coupling catalysts are less active when employed in the process of the present invention, and moreover produce lower molecular weight copolycarbonates which are difficult to wash.

The procedure described in Example 1 was repeated, excepting that 0.07 g (0.5 mole %) of triethylamine was employed as the catalyst. After 60 minutes of agitation, copolymer formation remained incomplete as indicated by the presence of chloroformates in the organic phase. Additional triethylamine was then added intermittently over a period of 80 minutes to complete the copolymerization; a total of 0.84 g (6 mole%) of triethylamine was therefore required for complete copolymerization. The two phases of the unagitated resultant mixture separated very slowly over a period of 18 hours, and formed a substantial emulsion layer. The copolymer solution was washed as described in Example 1, excepting that several hours were required to allow the phases to separate. After standing for 18 hours, the copolycarbonate solution contained 2,313 ppm water, and formed an emulsion layer having a volume ratio (emulsion:emulsion+organic) of 0.30. The copolycarbonate, isolated and recovered by conventional methods, has a number average molecular weight of 11,627.

What is claimed is:

1. A purpose for the preparation of a high molecular weight segmented block copolymer from a diphenol and a tetrahalogenated diphenol, comprising the steps of sequentially:
   (A) contacting together a diphenol, a tetrahalogenated diphenol, an organic solvent, and an aqueous metal hydroxide to form a mixture, wherein the diphenol and tetrahalogenated diphenol are in the bisalkali metal phenolate form, and the pH of the aqueous phase of the mixture is within about 10% of the pH of an equilibrium composition consisting solely of an aqueous solution of a molar amount of the diphenol in two normal alkali metal hydroxide;
   (B) next, continuously agitating the mixture, and adding to the agitated mixture phosgene, and an amount of additional alkali metal hydroxide sufficient to maintain the pH of the mixture within the about 10% range recited in step A, whereby diphenol polycarbonate oligomers having chloroformate end groups are prepared;
   (C) thereafter, adding to the agitated mixture additional phosgene sufficient to attain a decreased pH of the aqueous phase to within about 10% of the pH of an equilibrium composition consisting solely of an aqueous solution of a molar amount of the tetrahalogenated diphenol in two normal alkali metal hydroxide;
   (D) then, adding to the agitated mixture additional phosgene, while maintaining the pH of the aqueous phase of the mixture within the about 10% range recited in step C, whereby tetrahalogenated diphenol chloroformates are prepared; and
   (E) finally, adding to the mixture an amount of additional alkali metal hydroxide sufficient to attain and maintain an increased pH of the aqueous phase of the mixture within the about 10% range recited in step A,
   and an amount of an activated pyridine selected from the group consisting of
   4-aminopyridines of the general formula:

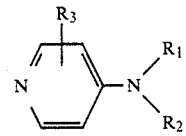

wherein $R_1$ and $R_2$, together with N, form a cyclic alkyl structure, or are each independently a monovalent alkyl radical, or are each independently a polymer chain such that the formula weight of the catalyst is less than 50,000, and $R_3$ is independently hydrogen or a monovalent alkyl radical, or 2-substituted pyridines of the general formula:

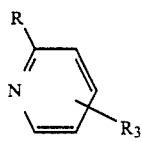

wherein R is a monovalent alkyl radical, a cycloalkyl radical, or a polymer chain such that the formula weight of the catalyst is less than 50,000, and $R_3$ is as previously defined, sufficient to catalyze the coupling of the diphenol polycarbonate oligomers having chloroformate end groups and the tetrahalogenated diphenol chloroformates, whereby a high molecular weight segmented block copolycarbonate is prepared.

2. The process according to claim 1, wherein the diphenol corresponds to the formula:

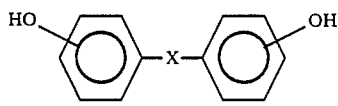

wherein X is a divalent $C_1$-$C_{15}$ alkyl, cyclic or branched hydrocarbon radical, a single bond, —O—, —S—, —S$_2$—, —SO—, —SO$_2$— or —CO—.

3. The process according to claim 2, wherein the diphenol is bisphenol A.

4. The process according to claim 1, wherein the tetrahalogenated diphenol corresponds to the formula:

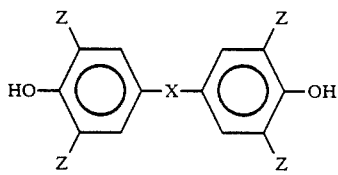

wherein X is a divalent $C_1$-$C_{15}$ alkyl, cyclic or branched hydrocarbon radical, a single bond, —O—, —S—, —S$_2$—, —SO—, —SO$_2$— or —CO—, and Z is a halo radical.

5. The process according to claim 4, wherein the tetrahalogenated diphenol is tetrabromobisphenol A or tetrachlorobisphenol A.

6. A process according to claim 1, wherein the activated pyridine is 4-dimethylaminopyridine.

7. The process according to claim 1, wherein the alkali metal hydroxide is selected from the group consisting of sodium hydroxide, lithium hydroxide and potassium hydroxide.

8. The process according to claim 7, wherein the alkali metal hydroxide is sodium hydroxide.

9. The process according to claim 1, wherein the solvent is selected from the group consisting of methylene chloride, chloroform, 1,2-dichloroethane and chlorobenzene.

10. The process according to claim 9, wherein the solvent is methylene chloride.

11. The process according to claim 1, wherein steps A, B and E are carried out at a pH from about 9 to about 13.5.

12. The process according to claim 11, wherein steps A, B and E are carried out at a pH from about 12 to about 13.

13. The process according to claim 1, wherein steps C and D are carried out at a pH from about 9 to about 12.

14. The process according to claim 13, wherein steps C and D are carried out at a pH from about 10 to about 11.

15. The process according to claim 1, wherein the reaction temperature during each step of the process is maintained from about 0° C. to about 50° C.

16. The process according to claim 16, wherein the reaction temperature during each step of the process is maintained from about 15° C. to about 30° C.

17. The process according to claim 1, wherein the activated pyridine is employed in an amount from about 0.001 to about 10 mole percent based upon the total moles of diphenol and tetrahalogenated diphenol.

18. The process according to claim 17, wherein the activated pyridine is employed in an amount from about 0.05 to about 5.0 mole percent based upon the total moles of diphenol and tetrahalogenated diphenol.

19. The process according to claim 1, wherein steps A through E are conducted in a singular reaction vessel.

20. The process according to claim 1, wherein step D is conducted in a first reaction vessel, and step E is conducted in a second reaction vessel.

21. The process according to claim 1, wherein each of steps A through E are conducted independently in a series of individual reaction vessels.

22. The process according to claim 1, wherein the process is conducted in a continuous reaction system having multiple reaction zones.

23. A process for the preparation of a high molecular weight segmented block copolymer, comprising the steps of:

($A_1$) contacting together a diphenol polycarbonate oligomer having chloroformate end groups, a tetrahalogenated diphenol chloroformate, an organic solvent and an aqueous metal hydroxide to form a mixture, wherein the pH of the aqueous phase of the mixture is within about 10% of the pH of an equilibrium composition consisting solely of an aqueous solution of a molar amount of the diphenol polycarbonate in two normal alkali metal hydroxide; and ($B_1$) thereafter, adding to the mixture an amount of an activated pyridine selected from the group consisting of 4-aminopyridines of the general formula:

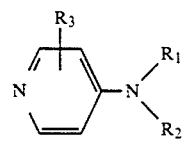

wherein $R_1$ and $R_2$, together with N, form a cyclic alkyl structure, or are each independently a monovalent alkyl radical, or are each independently a polymer chain such that the formula weight of the catalyst is less than 50,000, and $R_3$ is independently hydrogen or a monovalent alkyl radical, or 2-substituted pyridines of the general formula:

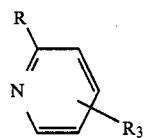

wherein R is a monovalent alkyl radical, a cycloalkyl radical, or a polymer chain such that the formula weight of the catalyst is less than 50,000, and $R_3$ is as previously defined, sufficient to catalyze the coupling of the diphenol polycarbonate oligomers having chloroformate end groups and the tetrahalogenated diphenol chloroformates, whereby a high molecular weight segmented block copolycarbonate is prepared.

24. The process according to claim 23, wherein the tetrahalogenated diphenol chloroformate is a tetrahalogenated diphenol oligomer having chloroformate end groups.

25. The process according to claim 23, wherein the diphenol polycarbonate oligomer contains repeated units corresponding to the general formula:

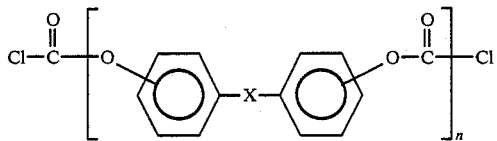

wherein X is a divalent $C_1$–$C_{15}$ alkyl, cyclic or branched hydrocarbon radical, a single bond, —O—, —S—, —$S_2$—, —SO—, —$SO_2$—, or —CO—.

26. The process according to claim 23, wherein the diphenol polycarbonate oligomer is prepared from bisphenol A.

27. The process according to claim 23, wherein the tetrahalogenated diphenol chloroformate corresponds to the formula:

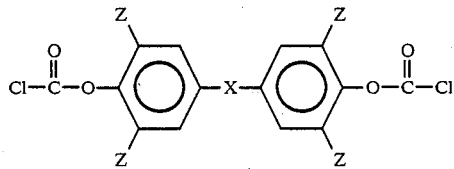

wherein X is a divalent $C_1$–$C_{15}$ alkyl, cyclic or branched hydrocarbon radical, a single bond, —O—, —S—, —$S_2$—, —SO—, —$SO_2$— or —CO—, and Z is a halo radical.

28. The process according to claim 24, wherein the tetrahalogenated diphenol chloroformate contains repeated units corresponding to the general formula:

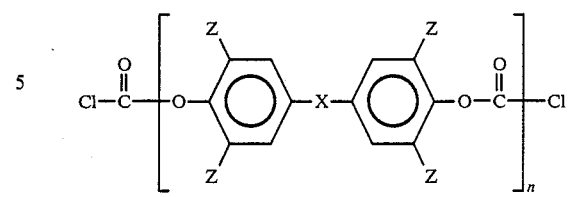

wherein X is a divalent $C_1$–$C_{15}$ alkyl, cyclic or branched hydrocarbon radical, a single bond, —O—, —S—, —$S_2$—, —SO—, —$SO_2$— or —CO—, and Z is a halo radical.

29. The process according to claim 27, wherein Z is bromo or chloro.

30. The process according to claim 28, wherein Z is bromo or chloro.

31. The process according to claim 23, wherein the activated pyridine is 4-dimethylaminopyridine.

32. The process according to claim 23, wherein the alkali metal hydroxide is selected from the group consisting of sodium hydroxide, lithium hydroxide and potassium hydroxide.

33. The process according to claim 32, wherein the alkali metal hydroxide is sodium hydroxide.

34. The process according to claim 23, wherein the solvent is selected from the group consisting of methylene chloride, chloroform, 1,2-dichloroethane and chlorobenzene.

35. The process according to claim 34, wherein the solvent is methylene chloride.

36. The process according to claim 23, wherein steps $A_1$ and $B_1$ are carried out at a pH from about 9 to about 13.5.

37. The process according to claim 36, wherein steps $A_1$ and $B_1$ are carried out at a pH from about 12 to about 13.

38. The process according to claim 23, wherein the reaction temperature during each step of the process is maintained from about 0° C. to about 50° C.

39. The process according to claim 38, wherein the temperature during each step of the process is maintained from about 15° C. to about 30° C.

40. The process according to claim 23, wherein the activated pyridine is employed in an amount from about 0.001 to about 10 mole percent based upon the total moles of diphenol polycarbonate oligomer and tetrahalogenated diphenol chloroformate.

41. The process according to claim 40, wherein the activated pyridine is employed in an amount from about 0.05 to about 5.0 mole percent based upon the total moles of diphenol polycarbonate oligomer and tetrahalogenated diphenol chloroformate.

42. The process according to claim 23, wherein steps $A_1$ and $B_1$ are conducted in a singular reaction vessel.

43. The process according to claim 23, wherein steps $A_1$ and $B_1$ are conducted independently in individual reaction vessels.

44. The process according to claim 23, wherein the process is conducted in a continuous reaction system having multiple reaction zones.

* * * * *

UNITED STATES PATENT AND TRADEMARK OFFICE
CERTIFICATE OF CORRECTION

PATENT NO. : 4,902,758

DATED : February 20, 1990

INVENTOR(S) : Maurice J. Marks

It is certified that error appears in the above-identified patent and that said Letters Patent is hereby corrected as shown below:

Column 1, line 46, "halogencontaining" should correctly appear as --halgen-containing--.

Column 4, line 60, "2,2-bis)4-hydroxy-35,-dibromophenyl)-propane," should correctly appear as --2,2-bis(4-hydroxyphenyl)-propane,--.

Column 6, line 12, "100%" should correctly appear as --10%--.

Column 8, line 26, "of" should correctly appear as --or--.

Column 8, line 49, "halogencontaining" should correctly appear as halgen-containing--.

Column 10, line 14, "purpose" should correctly appear as --process--.

Signed and Sealed this

Twentieth Day of August, 1991

Attest:

HARRY F. MANBECK, JR.

*Attesting Officer*  *Commissioner of Patents and Trademarks*